Figure 1:
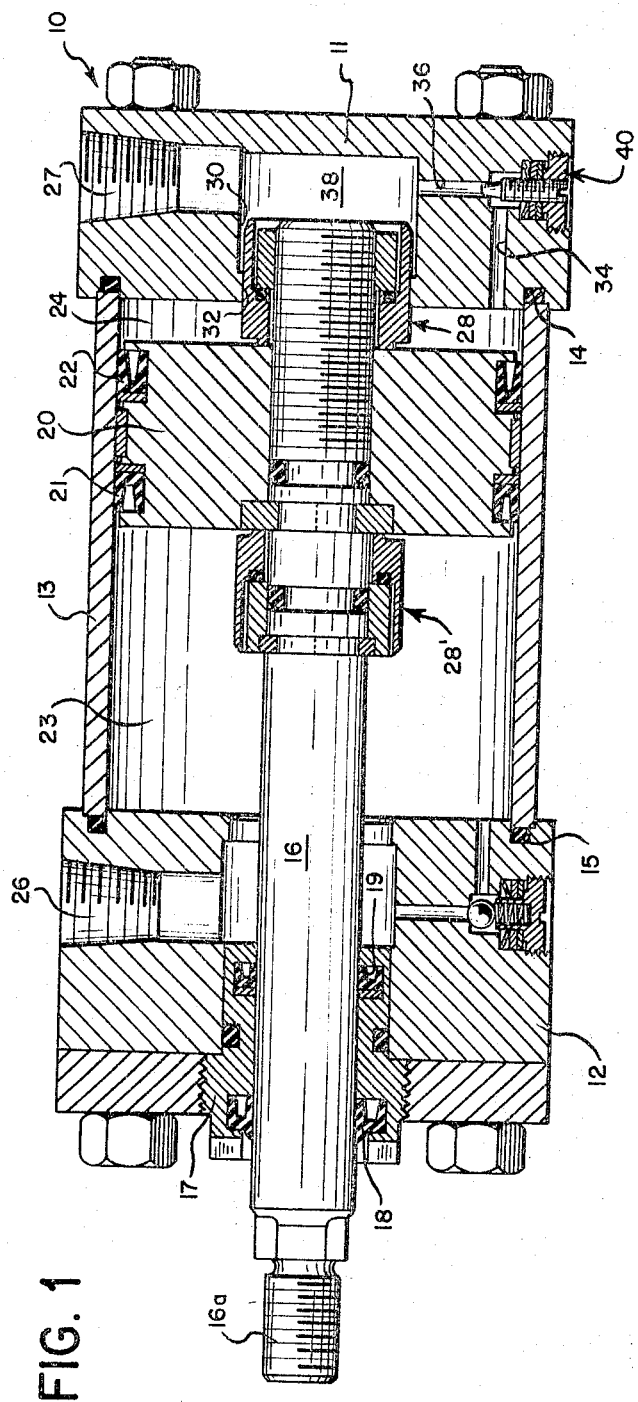

June 13, 1967 W. ASLAN 3,324,892

METERING DEVICE

Original Filed Dec. 3, 1962

INVENTOR
Wilfred Aslan
BY
*Bennie, Edmonds, Morton, Taylor & Adams*
ATTORNEYS

United States Patent Office 3,324,892
Patented June 13, 1967

3,324,892
METERING DEVICE
Wilfred Aslan, Mahwah, N.J., assignor to Alkon Products Corporation, Hawthorne, N.J., a corporation of New York
Original application Dec. 3, 1962, Ser. No. 241,666, now Patent No. 3,247,767, dated Apr. 26, 1966. Divided and this application Oct. 15, 1965, Ser. No. 496,564
1 Claim. (Cl. 138—45)

This application is a division of my copending application, Ser. No. 241,666, filed Dec. 3, 1962, therefor; entitled Fluid Cylinder, which issued as Patent No. 3,247,767 on Apr. 26, 1966. The present invention relates generally to improvements in metering valves adapted to be used in fluid cylinders of the pneumatic or hydraulic type and more particularly to a metering valve having an adjusting screw for regulating the rate of flow of fluid through a metering passage, and an associated housing construction which is compressively loaded to effect a sealing of the metering device within the cylinder housing which sealing is unaffected by subsequent adjustment of the screw.

In providing a pneumatic or hydraulic type of fluid cylinder, for example, with a screw type of adjustable metering device having a metering screw threadably positioned in the housing of the metering device and with the entire device, in turn, threaded into the housing of the cylinder, difficulties have been encountered in assuring that the metering device remains sealed in the cylinder housing against leakage of fluid. These difficulties have arisen due to the requirement that the metering screw be constructed for movement within the housing structure of the metering device to control the cross-sectional dimension of the metering passage. Such movement of the metering screw has the tendency of upsetting the seal between the relatively movable parts of the metering device; and the fluid within the hydraulic cylinder being under pressure tends to escape around these opposed surfaces if the seal between them is so disturbed.

In accordance with the teachings of the present invention, a screw type of metering device is provided with a seal that is automatically compressively loaded upon the original insertion of the metering device into the housing of the cylinder. Once the metering device has been connected to the cylinder housing in sealed relationship therewith, the metering screw may be adjusted axially of the device without disrupting the relative position of the remaining parts of the device and therefore without upsetting the seal.

In accordance with the teachings of the present invention, a gland nut is provided for connecting an adjustable metering screw to the end cap of a fluid cylinder, for example. Surrounding the shaft of the screw is a packing disc, a back-up washer and a spring washer of the Belleville type in that order. When the gland nut is assembled to the end cap of the fluid cylinder, the spring washer is brought to bear against an internal shoulder within the cylinder cap. The spring washer thereafter will exert a compressive resilient loading upon the back-up washer and upon the packing, with the latter in sealing engagement with the threads of the metering screw and the wall surface of the bore which receives the gland nut. The screw may thereafter be adjusted axially to secure a proper flow of fluid through the metering passage and at all times during such adjustment, the spring washer will exert a sufficient pressure upon the packing which engages the threads of the screw to assure that leakage will not occur.

Figure 2:
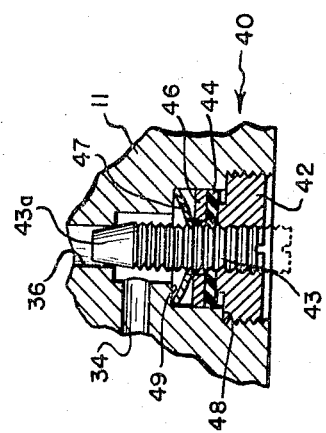

A more complete understanding of the present invention and the operation thereof will be obtained from a reading of the following specification with reference being made to the accompanying drawings of which:

FIG. 1 is a longitudinal cross-sectional view of a fluid cylinder constructed to include the metering device of the present invention; and FIG. 2 is an enlarged detail of the metering device shown in FIG. 1.

Referring now to the drawings, a fluid cylinder 10 has been illustrated having end caps 11, 12 which are secured at each end to an intermediate cylindrical body 13. O-ring seals 14, 15 are provided to effect fluid seals at the junctures of the caps and the cylinder body. The cap 12 journals a piston rod 16, one end 16a thereof projecting from the cap 12 for attachment to a device to be operated or moved by the cylinder 10. The cap 12 threadedly receives a journal bushing 17 having pressure responsive seal members 18, 19 for engaging portions of the rod 16 to prevent leakage past the rod from the interior of the cylinder.

A piston 20 is mounted to the rod 16 adjacent the internal end thereof for reciprocating movement within the cylinder body 13. The piston 20 has pressure responsive seal members 21, 22 for effecting a seal between the periphery of the piston and the interior wall surface of the cylinder body 13 upon the admission of a pressure fluid into the cylinder body 13 for driving the piston. Pressure fluid will be admitted to chambers 23 and 24 alternately through ports 26, 27 in the end caps 12, 11. It will be understood that each of the ports 26, 27 will also serve as an exhaust orifice for evacuating a chamber 23, 24 during one half of a cycle.

The piston rod 16 carries adjacent opposite faces of the piston 20, cushion units designated generally by reference numerals 28, 28'. The end cap 11 of the cylinder defines a bore 30 having an area of reduced diameter 32 immediately adjacent to the chamber 24. When the piston 20 is driven toward the right by the admission of a pressure fluid through the port 26 and into the chamber 23, fluid in chamber 24 will first be permitted to escape through the bore 30 and therefrom through the port 27. But as the piston nears the end of its stroke, the cushion element 28 will begin to enter the neck or reduced area 32 of the bore 30.

As the cushion element 28 achieves a seal within the bore 32, the pressure in chamber 24 will increase and provide a gradual decelerating effect against the right face of the piston 20. In order to continue movement of the piston to the end of its stroke, bypass metering passages 34, 36 are provided which conduct fluid from the chamber 24 to the chamber 38 and therefrom through the exhaust orifice 27. From an examination of the drawings, it will be apparent that the cushion unit 28' will operate in the same manner as has been described in connection with the cushion unit 28.

In accordance with the teachings of the present invention, the degree of cushioning provided in the cylinder is made variable by means of a metering screw device 40. Although only one such metering device is shown at the right hand end of the cylinder, it is to be understood that an identical structure could be included at the left hand end of the cylinder.

In accordance with the invention, reference is made to FIG. 2 wherein the metering device 40 is shown in detail. The device 40 includes a gland 42 which carries a central metering screw 43 having a frusto-conical metering surface 43a at the upper end thereof. The gland 42 further carries a disc shaped packing 44 threaded on the inside diameter as shown in FIG. 2 to mate with the threaded surface of the metering screw, a retainer washer 46 and a Belleville spring disc washer 47 in succession. The metering screw device 40 is installed within the cap 11 by first threading the gland 42 into a tapped bore at the cap 11 provided for that purpose. The gland 42 will be provided with spanner wrench holes or similar means for applying torque thereto and will be turned until the gland bottoms against a shoulder 48 in the cap. The spring washer 47 will previously have abutted a second internal shoulder 49 and during the final threading of the gland 42 toward and against the shoulder 48, the washer 47 will exert compressive loading upon the retainer 46 and upon the packing 44. The packing under such compressive force will cold-flow into the thread grooves of the screw 43 thereby effecting a seal and further will effect a seal about its periphery with the adjacent wall surface of the cap. Satisfactory materials for the packing are harder grades of synthetic rubber and many plastic materials such as nylon and Teflon.

The advantage of the foregoing arrangement is that once the gland 42 has been originally installed, its position and the relative positions of the members 44, 46 and 47 need not be changed materially in order to effect adjusting movement of the metering screw 43. The latter may be adjusted axially in accordance with metering requirements to vary the flow of fluid in the passages 34, 36 providing the cushion effect desired, and since the washer 47 constantly exerts compressive loading upon the packing 44 the seal between the packing and the threads of the screw 43 will be maintained. Satisfactory sealing after repeated adjustments have been made at varying pressures from vacuum to 10,000 p.s.i.

It will be understood that the foregoing description relates to a particular embodiment of the invention and is merely representative. Therefore, in order to appreciate fully the spirit and scope of the present invention, reference should be made to the appended claim, in which,

I claim:

An adjustable metering device for regulating the flow of fluid through a walled passageway comprising a gland nut, a threaded metering bore in the wall of said passageway for receiving said nut, a metering screw carried by said nut in axial alignment therewith for insertion within said passageway, said screw being threaded centrally to said nut and adjustable axially relative thereto, an internally threaded disc-like resilient packing seal of a material having permanent cold flow properties disposed adjacent to the inner face of said nut and in threaded engagement with the thread of said screw, a flat retainer continuously disposed adjacent to said packing, a spring washer disposed adjacent to said retainer with central portions thereof in contact with said retainer, a shoulder defined within said metering bore for effecting compression of said washer toward said retainer, packing seal and nut upon threading of said nut into said metering bore to resiliently load said seal into permanently deformed engagement with said screw and hold said nut, seal, retainer and washer in substantially fixed position upon axial adjustments of said screw.

References Cited

UNITED STATES PATENTS

| | | | |
|---|---|---|---|
| 1,572,922 | 2/1926 | Govers et al. | 277—105 X |
| 1,583,050 | 5/1926 | Keller | 138—46 X |
| 2,646,959 | 7/1953 | Carver | 277—112 X |
| 3,192,942 | 7/1965 | Manor et al. | 277—106 X |

LAVERNE D. GEIGER, *Primary Examiner.*

T. L. MOORHEAD, *Assistant Examiner.*